United States Patent [19]

Watanabe

[11] Patent Number: 5,091,027
[45] Date of Patent: Feb. 25, 1992

[54] PROCESS FOR PRODUCING HARD ROLL

[75] Inventor: Atsuo Watanabe, Osaka, Japan

[73] Assignee: Yamauchi Corporation, Osaka, Japan

[21] Appl. No.: 567,529

[22] Filed: Aug. 15, 1990

[51] Int. Cl.$^5$ .................. B29C 39/12; B29C 41/20; B29C 41/30

[52] U.S. Cl. ................... 156/172; 156/187; 156/213; 264/250; 264/257; 264/258; 264/262; 29/132

[58] Field of Search ............... 156/172, 184, 187, 213; 264/250, 255, 257, 258, 261, 241, 248, 263, 275, 277, 278, 279, 279.1, 136, 137, 262; 29/132

[56] References Cited

U.S. PATENT DOCUMENTS

| | | | |
|---|---|---|---|
| 1,318,520 | 10/1919 | Wolever | 264/261 |
| 3,294,889 | 12/1966 | Downie et al. | 264/261 |
| 3,514,312 | 5/1970 | Gardiner | 29/132 |
| 3,646,651 | 3/1972 | McGaughey | 29/132 |
| 3,673,025 | 6/1972 | Fukuyama | 29/132 |
| 4,368,568 | 1/1983 | Watanabe | 29/132 |
| 4,466,164 | 8/1984 | Tadokoro | 29/132 |

*Primary Examiner*—Jay H. Woo
*Assistant Examiner*—Jeremiah F. Durkin, II

[57] ABSTRACT

A hard roll is produced by a process utilizing the steps of winding a fiber material impregnated with a thermosetting resin around the outer peripheral surface of a metal roll core to form a fiber-reinforced lower winding layer, then injecting a thermosetting synthetic resin material into a mold of predetermined size and curing the material at a specified temperature to form an outer layer hollow cylinder separately from the first step. The next stepsave fitting the outer layer cylinder around the roll core covered with the winding layer, and injecting an adhesive of low viscosity into an annular clearance between the winding layer and the cylinder and then curing the adhesive at a specified temperature to bond the winding layer to the cylinder with the layer of adhesive.

17 Claims, 2 Drawing Sheets

PROCESS FOR PRODUCING HARD ROLL

BACKGROUND OF THE INVENTION

The present invention relates to a process for producing hard rolls for use in various industries, for example, for papermaking and fibers, and more particularly to a process for producing hard rolls for use as elastic rolls including papermaking calender rolls, papermaking press rolls, fiber calender rolls, calender rolls for magnetic recording materials, etc.

Generally, paper, fiber, magnetic recording material or like thin material is calendered by being passed between a mirror-surfaced metal roll and an elastic roll opposed thereto at a predetermined temperature and high pressure and made smooth and glossy over the surface by the application of pressure.

Accordingly, the following characteristics are required of the hard roll for use as the elastic roll for calendering (hereinafter referred to as the "calender roll").

(1) Satisfactory surface smoothness.
(2) Hardness, especially surface hardness, remaining unchanged at the operating temperature.
(3) Heat resistance to render the roll less likely to deform due to thermal expansion or melting that would result from autogenous heat.
(4) Compression strength to withstand the high nip pressure applied by the metal roll for the roll to remain free of cracking or breaking.

Conventionally, calender rolls are produced by winding an epoxy resin-impregnated fiber material around a metal roll core to form a lower winding layer covering the core, placing the roll core covered with the winding layer into a mold of predetermined size, and injecting an epoxy resin material into the mold directly to form an epoxy resin covering layer within the mold on curing (see, for example, Examined Japanese Patent Publication SHO 61-15807).

However, epoxy resin or like thermosetting resin generally undergoes marked reaction contraction and thermal shrinkage when curing, so that the contraction or shrinkage is likely to produce a crack in the surface of the hard roll to be produced.

Especially in the case of papermaking calender rolls and the like which are great in diameter and length, the use of epoxy resin or like thermosetting resin for the covering layer entails the problem that a crack develops in the roll surface owing to shrinkage during curing to make it impossible to obtain the roll.

SUMMARY OF THE INVENTION

The main object of the present invention is to provide a process for producing hard rolls free of the above problem.

The process of the invention for producing a hard roll comprises the first step of winding a fiber material impregnated with a thermosetting resin around the outer peripheral surface of a metal roll core to form a fiber-reinforced lower winding layer, the second step of injecting a thermosetting synthetic resin material into a mold of predetermined size and curing the material at a specified temperature to form an outer layer hollow cylinder separately from the first step, and the third step of fitting the outer layer hollow cylinder around the metal roll core covered with the lower winding layer, injecting an adhesive of low viscosity into an annular clearance between the lower winding layer and the cylinder and curing the adhesive at a specified temperature to bond the lower winding layer to the cylinder with the layer of adhesive.

The roll produced by the process of the present invention has excellent surface smoothness, high surface hardness and high heat resistance. The process prevents cracks from developing in the surface of the outer layer cylinder of thermosetting synthetic resin during the production process or during use. Moreover, the roll retains surface hardness which remains almost unchanged even when subjected to heat during use, has compression strength sufficient to withstand the high nip pressure to be applied by a metal roll and is satisfactorily usable at all times with high durability.

The process of the present invention is useful for producing not only small rolls and medium-sized rolls but also papermaking calender rolls and like large rolls which were conventionally difficult to produce, thus affording large rolls having very high compression strength.

When the adhesive of low viscosity used is one curable at a temperature approximately the same as the operating temperature of the hard roll obtained, the outer layer cylinder can be free from any residual stress when the roll is used, such that the cylinder retains high resistance against breaking even when subjected to high pressure.

The present invention will be described in greater detail with reference to the accompanying drawings.

DESCRIPTION OF THE PREFERRED EMBODIMENT

Figure 1:
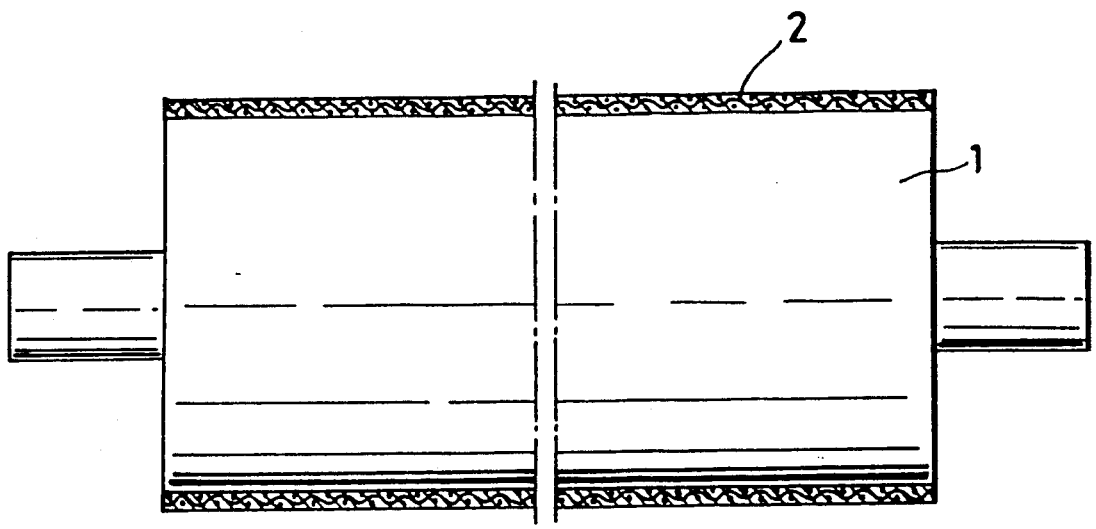
FIG. 1 is a sectional view partly broken away and showing a roll core covered with a lower winding layer and obtained by the first step of the present process.

Throughout the drawings, like parts are designated by like reference numerals.

With reference to the drawings, the process of the present invention for producing a hard roll comprises the first step of winding a fiber material impregnated with a thermosetting resin around the outer peripheral surface of a metal roll core 1 to form a fiber-reinforced lower winding layer 2, the second step of injecting a thermosetting synthetic resin material into a mold of predetermined size and curing the material at a specified temperature to form an outer layer hollow cylinder 3 separately from the first step, and the third step of fitting the outer layer hollow cylinder 3 around the metal roll core 1 covered with the lower winding layer 2, injecting an adhesive of low viscosity into an annular clearance between the lower winding layer 2 and the cylinder 3 and curing the adhesive at a specified temperature to bond the lower winding layer 2 to the cylinder 3 with a layer 4 of the adhesive.

With reference to FIG. 1, the metal roll core 1 for use in the first step is made of a metal such as iron, copper, stainless steel or aluminum. To join the lower winding layer 2 more firmly to the roll core 1, it is desirable to make the outer periphery of the core 1 rough-surfaced by sandblasting or by forming a multiplicity of helical grooves.

A fiber material impregnated with a thermosetting resin is wound around the outer peripheral surface of the metal roll core 1 to a predetermined thickness, whereby the fiber-reinforced lower winding layer 2 is formed.

The fiber material to be used may be made of an inorganic fiber or organic fiber. It is desirable to use an inorganic fiber, such as glass fiber, carbon fiber or metal fiber, which is hard, has high ability to restore itself elastically, exhibits good adhesion to resins and exerts high fastening pressure. Also usable is an organic fiber such as polyamide fiber, aromatic polyamide fiber, polyimide fiber, polyester fiber, phenolic fiber or acrylic fiber.

The fiber material is in the form of a yarn, roving, cloth tape or the like. In view of the strength of the roll obtained, it is desirable to use the cloth tape, or the roving and cloth tape in combination.

Examples of thermosetting resins for impregnating the fiber material are epoxy resin, unsaturated polyester resin, diallyl phthalate resin, polyimide resin and the like. Such thermosetting resins include those curable by heating and those curable at room temperature.

A filler in the form of a finely divided inorganic material, such as quartz, glass beads, hydrated alumina, clay powder, silica powder or calcium carbonate, may be used as admixed with the thermosetting resin. The finely divided inorganic material is 1 to 200 $\mu$m, preferably 5 to 100 $\mu$m, in mean particle size. If less than 1 $\mu$m in mean particle size, the inorganic material is difficult to obtain, costly and therefore undesirable. When larger than 200 $\mu$m, the material is difficult to disperse in the resin uniformly.

A nonwoven fabric is also usable for the lower winding layer 2. For example, a cloth tape, or roving and cloth tape impregnated with a filler-containing thermosetting resin is wound around the core to form a layer, and a nonwoven fabric similarly impregnated with a filler-containing thermosetting resin is wound around the first layer to form a layer as fitted over and joined to the first layer and thereby form a lower winding layer 2.

Such a nonwoven fabric has the excellent function of holding a finely divided inorganic material as uniformly incorporated therein in its entirety. The nonwoven fabric to be used is made of an organic fiber such as acrylic fiber, polyester fiber or phenolic fiber, or an inorganic fiber such as glass fiber or metal fiber. Preferably, the nonwoven fabric is in the form of a tape.

The lower winding layer 2 is 1 to 50 mm in overall wall thickness. If less than 1 mm in thickness, the layer 2 is insufficient in strength, exerts a small fastening pressure on the roll core 1 and therefore is not suitable to use. On the other hand, if the thickness exceeds 50 mm, the layer will not have a correspondingly increased strength but becomes rather more costly and is therefore undesirable. In view of the strength of the roll, fastening pressure on the roll core 1, etc., the thickness of the lower winding layer 2 is preferably in the range of 6 to 15 mm.

When the lower winding layer 2 comprises the layer of cloth tape, or roving and cloth tape impregnated with a filler-containing thermosetting resin, and the layer of nonwoven fabric similarly impregnated with a filler-containing thermosetting resin wound around and joined to the layer, the nonwoven fabric layer is preferably 0.3 to 2.0 mm in thickness so as to be rapidly and uniformly impregnated with the filler-containing thermosetting resin.

For the nonwoven fabric to hold the finely divided inorganic material as uniformly dispersed therein, it is suitable that the nonwoven fabric be about 30 to about 250 g/m$^2$ in weight.

The ratio of the thermosetting resin to the finely divided inorganic material to be mixed therewith is, for example, 1:0.5 to 1:2 by weight.

The lower winding layer 2 thus formed on the outer peripheral surface of the roll core 1 and positioned between the roll core and the outer layer cylinder serves to bond these members together satisfactorily and also functions to exert an enhanced fastening pressure on the roller core to prevent the separation of the cylinder from the roll core 1.

Figure 2:
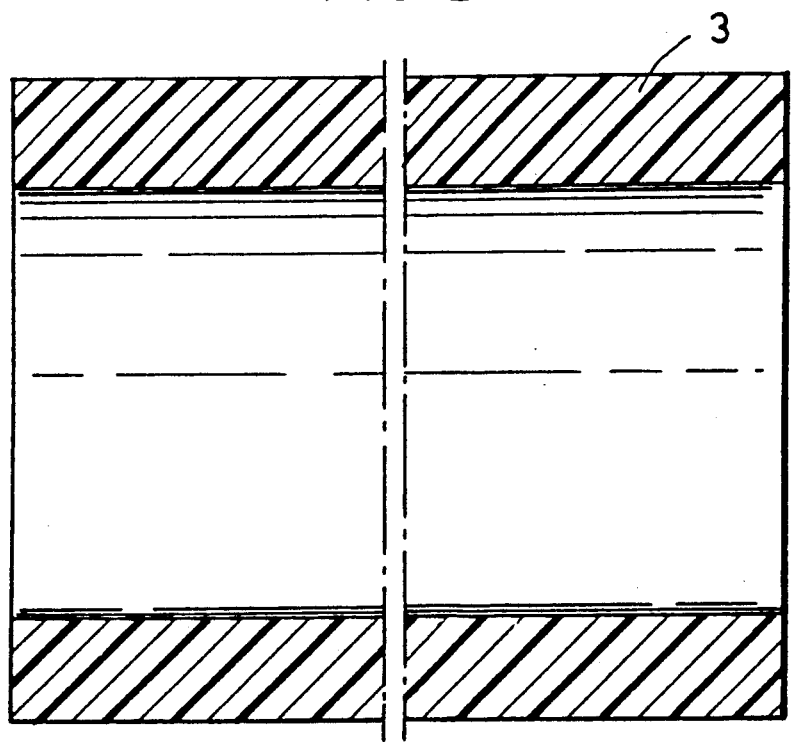
FIG. 2 is a sectional view partly broken away and showing an outer layer hollow cylinder formed by the second step of the present process.

In the second step, the outer layer cylinder 3 shown in FIG. 2 is prepared separately from the metal roll core 1 having the fiber-reinforced lower winding layer 2, by injecting a thermosetting synthetic resin material into a mold of predetermined size and curing the material at a specified temperature.

As is the case with the lower winding layer 2, examples of useful thermosetting synthetic resin materials are epoxy resin, unsaturated polyester resin, diallyl phthalate resin, polyimide resin, polyester amide resin and the like. As in the case of the lower winding layer 2, a filler can be admixed with the resin.

Any of epoxy resins is usable such as glycidyl ether epoxy resin, cyclic aliphatic epoxy resin, heterocyclic epoxy resin or the like. Usable as the curing agent for the epoxy resin is an amine, acid anhydride, polyamide resin or the like.

The temperature at which the thermosetting resin is cured is dependent on the kind of resin used. When the resin is one curable by heating, the curing temperature is usually 100° to 300° C. If it is one curable at room temperature, the resin is reacted at room temperature for curing. In the former case, the resin undergoes reaction contraction during curing and also thermal shrinkage when cooled after molding. In the latter case, the resin undergoes reaction contraction during curing. In any case, the cylinder forming mold to be used is one so constructed as to fully absorb the deformation due to such contraction or shrinkage. This permits the resin to fully cure, forming the outer layer cylinder 3 which has satisfactory surface smoothness, high surface hardness, excellent compression strength and high heat resistance.

The outer layer cylinder 3 is 5 to 100 mm, preferably 15 to 30 mm, in wall thickness. If less than 5 mm in thickness, the cylinder 3 fails to have sufficiently high strength and is low in durability. Even if the thickness exceeds 100 mm, the cylinder will not exhibit greatly improved strength but becomes more costly and is therefore undesirable.

Figure 3:
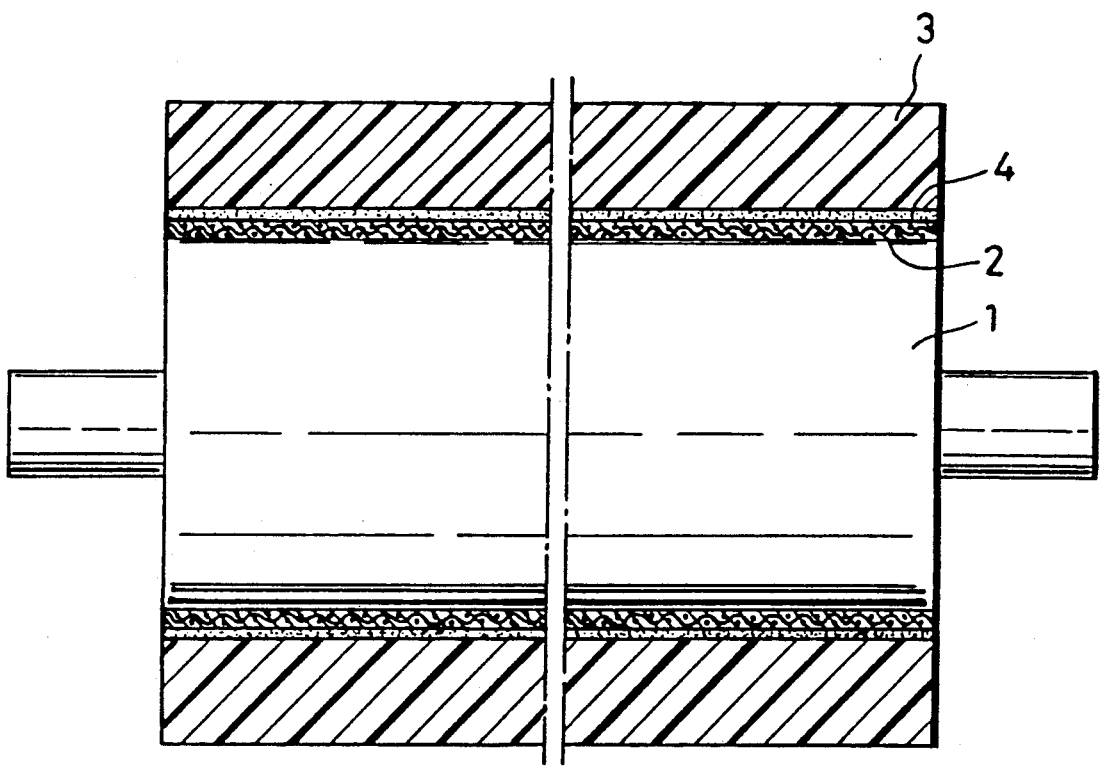
FIG. 3 is a sectional view partly broken away and showing a hard roll and formed by the third step of the present process.

In the third step, the outer layer cylinder 3 is fitted around the metal roll core 1 having the fiber-reinforced lower winding layer 2 and obtained as above, an adhesive of low viscosity is injected into an annular clearance formed between the lower winding layer 2 and the cylinder 3, and the adhesive is cured at a specified temperature to bond the lower winding layer 2 to the cylinder 3 with the adhesive layer 4 as shown in FIG. 3.

Examples of useful adhesives of low viscosity are those of epoxy resin type, unsaturated polyester resin type, diallyl phthalate resin type or the like.

The lower the viscosity, the better the adhesive. The viscosity is 5 to 500 cp, preferably 10 to 100 cp. When less than 5 cp in viscosity, the adhesive must be made to order and is therefore costly and undesirable. When in excess of 500 cp, the adhesive is excessively viscous and undesirable since the adhesive is likely to trap air therein when filling the clearance.

The adhesive is cured at a temperature usually of 20° to 100° C. It is especially desirable to cure the adhesive at a temperature approximately at the same level as the operating temperature of the resulting hard roll because this eliminates the residual stress of the outer layer cylinder 3 when the hard roll is in use, rendering the cylinder 3 more resistant to breaking even when subjected to a high pressure.

The layer 4 of the adhesive formed on curing is 0.05 to 5 mm, preferably 0.2 to 3 mm, in thickness. If the thickness is less than 0.05 mm, the adhesive layer 4 is insufficient in bond strength, whereas thicknesses over 5 mm are not desirable since greatly improved strength then will not result.

The present invention will be described with reference to the following examples.

EXAMPLE 1

A papermaking calender roll was prepared by the process of the invention.

First, an iron roll core 1 having a length of 4722 mm and a diameter of 480 mm was rough-surfaced over the outer periphery by sandblasting. An epoxy resin-impregnated fiber material was wound around the outer peripheral surface of the roll core 1 to form a fiber-reinforced lower winding layer 2, 6 mm in thickness and shown in FIG. 1. Finely divided silica, up to 44 μm in particle size, was admixed with the epoxy resin used, in an amount of 40 parts by weight per 120 parts by weight of the resin.

To wind the fiber material around the roll core 1 in the above step, a glass cloth tape impregnated with epoxy resin as mixed with the finely divided silica was wound around the roll core 1, and a glass roving similarly impregnated with epoxy resin was wound around the tape layer. The epoxy resin was cured at 110° C.

Next, separately from the above step, an epoxy resin material similarly mixed with finely divided silica was injected into a mold of predetermined size and cured at a temperature of 150° to 160° C. to form an outer layer hollow cylinder 3 measuring 3470 mm in length, 542 mm in outside diameter and 25 mm in wall thickness and shown in FIG. 2.

The outer layer cylinder 3 was fitted around the roll core 1 having the lower winding layer 2, an adhesive of low viscosity was injected into an annular clearance formed between the lower winding layer 2 and the cylinder 3, and the adhesive was cured at a temperature of 60° C. to bond the lower winding layer 2 to the outer layer cylinder 3 with the adhesive layer 4, 0.5 mm in thickness to obtain a hard roll shown in FIG. 3.

The hard roll was 4722 in length, 542 mm in diameter and 3470 mm in surface length.

The hard roll thus prepared was used as a papermaking calender roll continuously for 8 weeks at a line pressure of 350 kg/cm and at a rotational speed of 1000 m/min. Consequently, the roll surface was found to be free from defacement or cracking, and there was no need to polish the surface.

EXAMPLE 2

A papermaking calender roll was produced by the process of the invention as in Example 1 above.

First, an iron roll core 1 having a length of 3300 mm and a diameter of 410 mm was rough-surfaced over the outer periphery by sandblasting. A fiber material impregnated with unsaturated polyester resin was wound around the outer peripheral surface of the roll core 1 to form a fiber-reinforced lower winding layer 2, 6 mm in thickness and shown in FIG. 1. Before impregnation, finely divided silica, up to 44 μm in particle size, was admixed with the unsaturated polyester resin used, in an amount of 40 parts by weight per 120 parts by weight of the resin. The fiber material used was the combination of a glass cloth tape impregnated with the unsaturated polyester resin as mixed with the finely divided silica, and a glass roving similarly impregnated with the resin, as in the case of Example 1. The unsaturated polyester resin was cured at 120° C.

Next, separately from the above step, an unsaturated polyester resin material similarly mixed with finely divided silica was injected into a mold of predetermined size and cured at a temperature of 120° C. to form an outer layer hollow cylinder 3 measuring 2340 mm in length, 460 mm in outside diameter and 19 mm in wall thickness and shown in FIG. 2.

The outer layer cylinder 3 was fitted around the roll core 1 having the lower winding layer 2, and an adhesive of low viscosity was injected into an annular clearance formed between the lower winding layer 2 and the cylinder 3 and was cured at a temperature of 60° C. to bond the lower winding layer 2 to the outer layer cylinder 3 with the adhesive layer 4, 1 mm in thickness, whereby a hard roll shown in FIG. 3 was produced.

The hard roll was 3300 mm in length, 460 mm in diameter and 2340 mm in surface length.

The hard roll thus prepared was used as a papermaking calender roll continuously for 4 weeks at a line pressure of 200 kg/cm and at a rotational speed of 800 m/min. As a result, no defacement or cracking developed in the roll surface, nor was there any need to polish the surface.

The results of the foregoing examples reveal that the process of the present invention provided hard rolls having excellent surface smoothness, high surface hardness and excellent heat resistance. Moreover, no cracking developed in the surface of the outer layer cylinder of thermosetting synthetic resin during the production process.

While in use, the hard roll developed no cracking in its surface, retained surface hardness which remained almost free of variations even if the roll was heated during use, had compression strength sufficient to withstand the high nip pressure exerted thereon by a metal roll and was satisfactorily usable at all times with high durability.

The adhesive of low viscosity was cured at 60° C., i.e., approximately at the same temperature as the surface temperature of the hard roll during use, so that the outer layer cylinder was free from residual stress during use and was resistant to breaking even if subjected to a high pressure.

For a comparison, a hard roll was produced by the conventional process.

A fiber material impregnated with epoxy resin as mixed with finely divided silica was wound in exactly the same manner as in Example 1 around the same roll core as used in Example 1 to form a lower winding layer, 6 mm in thickness. The roll core formed with the lower winding layer was then placed in a mold of predetermined size, and an epoxy resin material as mixed with finely divided silica was injected directly into the mold and then cured at a temperature of 150° to 160° C. to form over the surface of the lower winding layer an outer layer as joined thereto and measuring 3470 mm in length, 542 mm in outside diameter and 25 mm in thickness.

The hard roll thus produced by the conventional process developed cracks in the surface after molding and was in no way usable as a papermaking calender roll. The cracking of the roll surface appears attributable to reaction contraction during curing of the epoxy resin and to thermal shrinkage resulting from cooling.

What is claimed is:

1. A process for producing a hard roll comprising:
   a first step of winding a fiber material impregnated with a thermosetting resin around the outer peripheral surface of a metal roll core to form a fiber-reinforced lower winding layer,
   a second step, independent from the first step, of injecting a thermosetting synthetic resin material into a mold of predetermined size and curing the material at an elevated temperature to form an outer layer hollow cylinder independent from the metal roll core having said fiber-reinforced lower winding layer, and
   a third step of fitting the outer layer hollow cylinder around the metal roll core covered with the lower winding layer, forming an annular clearance therebetween, then injecting an adhesive into said annular clearance, said adhesive having an appropriate viscosity for flowing into said clearance, forming an adhesive layer therein, and curing the adhesive at an elevated temperature to bond the lower winding layer to the cylinder with the adhesive layer.

2. A process as defined in claim 1 wherein the fiber material used for forming the fiber reinforced lower winding layer is selected from the group consisting of a roving and a cloth tape.

3. A process as defined in claim 1 wherein the fiber material for forming the lower winding layer is a fiber selected from the group consisting of glass fiber, carbon fiber, metal fiber, polyamide fiber, polyimide fiber, polyester fiber, phenolic fiber and acrylic fiber.

4. A process as defined in claim 1 wherein the thermosetting resin impregnating the fiber material for forming the lower winding layer is a resin selected from the group consisting of epoxy resin, unsaturated polyester resin, diallyl phthalate resin and polyimide resin.

5. A process as defined in claim 1 wherein a filler is mixed with the thermosetting resin impregnating the fiber material for forming the lower winding layer, the filler being in the form of a finely divided inorganic material selected from the group consisting of silicon material, hydrated alumina, clay powder, and calcium carbonate.

6. A process as defined in claim 5 wherein the finely divided inorganic material is 1 to 200 μm in mean particle size.

7. A process as defined in claim 1 wherein the lower winding layer comprises a roving layer and a cloth tape layer which are impregnated with the thermosetting resin mixed with a filler, and a nonwoven fabric layer impregnated with the thermosetting resin mixed with a filler and the nonwoven fabric layer is formed around the roving and cloth tape layers.

8. A process as defined in claim 1 wherein the thermosetting resin material for forming the outer layer hollow cylinder is a resin selected from the group consisting of epoxy resin, unsaturated polyester resin, diallyl phthalate resin, and polyimide resin.

9. A process as defined in claim 1 wherein the adhesive is an adhesive selected from the group consisting of epoxy resin unsaturated polyester resin and diallyl phthalate resin.

10. A process as defined in claim 9 wherein the viscosity of the adhesive is 5 to 500 cp.

11. A process as defined in claim 1 wherein the curing temperature of the adhesive is in the range of 20° to 100° C. and the operating temperature of the hard roll is in the range of 20°-100° C.

12. A process as defined in claim 1 wherein the lower winding layer is 1 to 50 mm in thickness, the outer layer hollow cylinder is 5 to 100 mm in thickness and the adhesive layer is 0.05 to 5 mm in thickness.

13. A process as defined in claim 1, wherein the fiber material for forming the lower winding layer is aromatic polyamide fiber.

14. A process as defined in claim 1, wherein a filler is mixed with the thermosetting resin impregnating the fiber material for forming the lower winding layer, said filler being quartz.

15. A process as defined in claim 1, wherein a filler is mixed with the thermosetting resin impregnating the fiber material for forming the lower winding layer, said filler being glass beads.

16. A process as defined in claim 1, wherein a filler is mixed with the thermosetting resin impregnating the fiber material for forming the lower winding layer, said filler being silica powder.

17. A process as defined in claim 1, wherein the thermosetting resin material for forming the outer layer cylinder is polyester amide resin.

* * * * *